United States Patent
Pertot et al.

(10) Patent No.: US 8,122,796 B2
(45) Date of Patent: Feb. 28, 2012

(54) MULTIPURPOSE EXPANSION WORK DEVICE FOR THE CUTTING OR EXPANSION OF METAL TUBES

(75) Inventors: Ladislao Pertot, Castelleone (IT); Stefano Agostino, Crema (IT)

(73) Assignee: Maus Italia F. Agostino & C.S.A.S, Bagnolo Cremasco (Cremona) (IT)

( * ) Notice: Subject to any disclaimer, the term of this patent is extended or adjusted under 35 U.S.C. 154(b) by 778 days.

(21) Appl. No.: 12/280,671

(22) PCT Filed: Mar. 14, 2007

(86) PCT No.: PCT/EP2007/002240
§ 371 (c)(1),
(2), (4) Date: Aug. 25, 2008

(87) PCT Pub. No.: WO2007/107273
PCT Pub. Date: Sep. 27, 2007

(65) Prior Publication Data
US 2009/0084234 A1    Apr. 2, 2009

(30) Foreign Application Priority Data
Mar. 21, 2006   (IT) .............................. MI2006A0502

(51) Int. Cl.
*B23B 5/16*   (2006.01)
*B23B 5/00*   (2006.01)
(52) U.S. Cl. .......................................... 82/113; 82/128
(58) Field of Classification Search .................... 82/113, 82/169, 128, 100, 131, 70.1; 166/55.7
See application file for complete search history.

(56) References Cited

U.S. PATENT DOCUMENTS

| | | | | |
|---|---|---|---|---|
| 341,046 | A | * | 5/1886 | Nuebling et al. ............... 30/107 |
| 1,907,178 | A | | 5/1933 | Crosby |
| 2,202,986 | A | * | 6/1940 | Ellis ............................ 166/55.7 |
| 2,407,101 | A | * | 9/1946 | Rosenboom ................. 144/205 |
| 3,330,366 | A | * | 7/1967 | Lowry et al. .................... 173/33 |
| 6,220,130 | B1 | * | 4/2001 | Beakley ......................... 82/113 |
| 6,536,316 | B2 | * | 3/2003 | Strait ............................. 82/113 |

FOREIGN PATENT DOCUMENTS

| | | |
|---|---|---|
| EP | 0268327 A1 | 5/1988 |
| EP | 0305942 A2 | 3/1989 |

* cited by examiner

*Primary Examiner* — Will Fridie, Jr.
(74) *Attorney, Agent, or Firm* — Fitch, Even, Tabin & Flannery, LLP

(57) ABSTRACT

The multipurpose expansion work device (10), adapted for the cutting, incision or expansion of metal tubes (T), comprises a tubular body (11) of support for a work tool (12) axially insertable in a metal tube (T), the work tool (12) having a plurality of elastically spreadable longitudinal arms (14), externally provided with an operating edge (15) intended to come into contact with an inner surface (T') of the metal tube (T). The device (10) also comprises an expansion member (16) for divaricating the elastic arms (14), which is provided at a first end with a conical divarication head (17), converging or diverging towards a linear actuator (18) connected at a second end to the expansion member (16). The device (10) moreover comprises manually operable stop means (20) for adjusting the insertion depth of the tool (12) inside the metal tube (T).

19 Claims, 3 Drawing Sheets

MULTIPURPOSE EXPANSION WORK DEVICE FOR THE CUTTING OR EXPANSION OF METAL TUBES

BACKGROUND OF THE INVENTION

The present invention concerns a multipurpose work device, adapted for the cutting, incision or expansion of metal tubes by means of expansion of a work tool; in particular, the present invention concerns a multipurpose work device, for manual use, usable for example for cutting metal tubes in heat exchangers and the like, in order to permit their dismantling, or for the expansion of new metal tubes during the construction of the exchangers themselves.

STATE OF THE ART

In general, manual-use devices are known for cutting metal tubes from their interior, which commonly comprise a support body axially insertable inside a metal tube, at least one cutting tool radially supported in a movable manner by the body itself, also comprising an axially movable conical head to control a movement and an adjustable radial thrust of the cutting tool against an inner surface of the tube. Such devices moreover comprise control means adapted to set a rotation to the support body of the cutting tool, such that the tool itself, by means of such rotation, can progressively affect the inner surface of the tube, setting the cutting tool in radially more external positions.

One device of this type nevertheless has particularly long execution times of the cutting, since to permit the rotation of the support body and cutting tool inside the tube, the maximum radial thrust which can be transmitted from the conical head on the tool itself must be limited; therefore, the cutting force which the tool exerts against the inner surface of the tube is equally limited, and consequently it is necessary to carry out a high number of rotations of the tool in order to cut the tube, employing a considerably amount of time for executing such operation.

In order to at least in part overcome such drawback, in the field of automatic multiple working machines a shearing device was proposed for metal tubes, making use of an expandable sector tool, such as for example described in EP-A-0 268 327.

The device illustrated in such document comprises a tubular support body to which a work tool is connected, axially insertable in a metal tube; the work tool has a tubular base, fixed to the support body, and a plurality of elastically spreadable longitudinal arms which stretch out from the base of the work tool, the arms being externally provided with a cutting edge of the metal tube.

The device moreover comprises an expansion member provided at a first end with a frustoconical divarication head of the divaricating arms of the tool, which is operatively connected to a linear actuator placed at a second end of the expansion member, by means of a longitudinal connection stem.

The frustoconical divarication head has a lateral surface diverging towards the linear actuator, from which the aforesaid longitudinal stem extends; in this manner, the connection stem has a high diameter, corresponding to that of the larger base of the frustoconical head.

The great radial size of the connection stem implies that the spreadable arms of the tool must have a correspondingly limited section in the radial sense, being externally bound by the inner dimension of the tubes to be cut; consequently, the arms of the tool have a limited resistance to bending stresses, as well as provide a limited elastic recovery force after the divarication, such that the device must foresee a cap, connected to the frustoconical head, to assist the reclosing of the spreadable arms once the cutting of the tube has been executed.

Therefore, such device has a complex structure and results susceptible to breaks of the tool arms due to their limited strength, with consequent reliability problems of the device itself.

OBJECTS OF THE INVENTION

Object of the present invention is to provide an expansion multipurpose work device for the cutting, incision or expansion of metal tubes, for preferentially manual use, which is structurally simple and reliable, and permits executing the cutting or expansion of the tubes in considerably limited times with respect to the known devices.

BRIEF DESCRIPTION OF THE INVENTION

The foregoing can be carried out by means of a multipurpose expansion work device for the cutting, incision or expansion of metal tubes, of the type comprising:
  a tubular support body having a longitudinal axis;
  a work tube axially insertable in a metal tube, the work tube having a tubular base, fixed to the support body, and a plurality of elastically spreadable longitudinal arms, which stretch out from said base of the work tool, each of said arms being externally provided with a respective operating edge intended to come into contact with an inner surface of the metal tube; and
  an expansion member for divaricating said elastic arms of the tool, said expansion member being provided at a first end of a conical divarication head, and being operatively connected at a second end to a linear actuator,
  characterised in that the divarication head has a lateral thrust surface converging or diverging towards the linear actuator, the linear actuator being connected to the divarication head to move the same head in said work tool between a forward disengagement position and a back divarication position, or viceversa, of the elastic arms of the tool, against the inner surface of the metal tube, and
  in that it comprises manually operable stop means for adjusting the insertion depth of the tool inside the metal tube.

BRIEF DESCRIPTION OF THE DRAWINGS

These and further characteristics according to the present invention will be clearer from the following description with reference to the attached drawings, wherein.

DETAILED DESCRIPTION OF THE INVENTION

The general characteristics of the present invention will be illustrated below through several embodiments.

Figure 1:
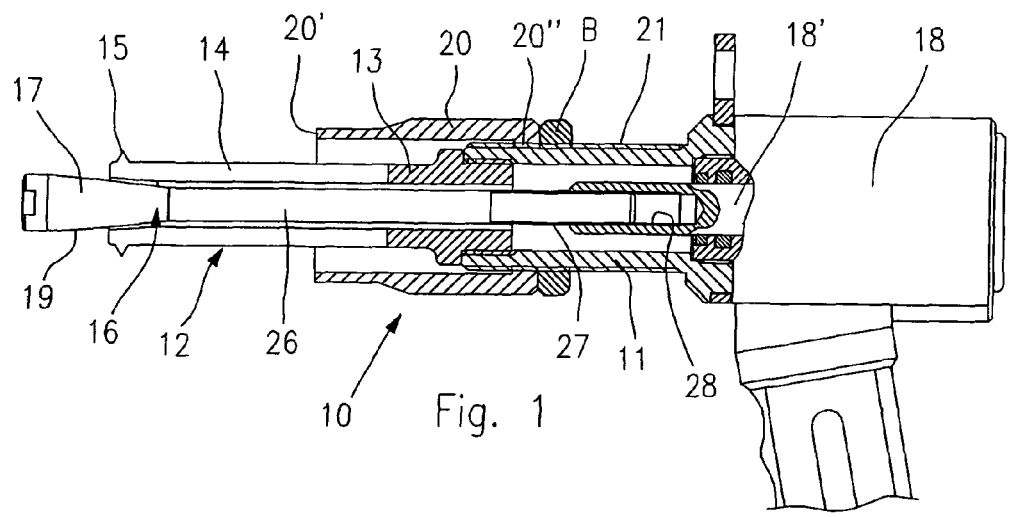
FIG. 1 represents a side view, partially sectioned in longitudinal sense, of a multipurpose expansion work device for the cutting of metal tubes according to a first embodiment of the present invention.
Figure 2:
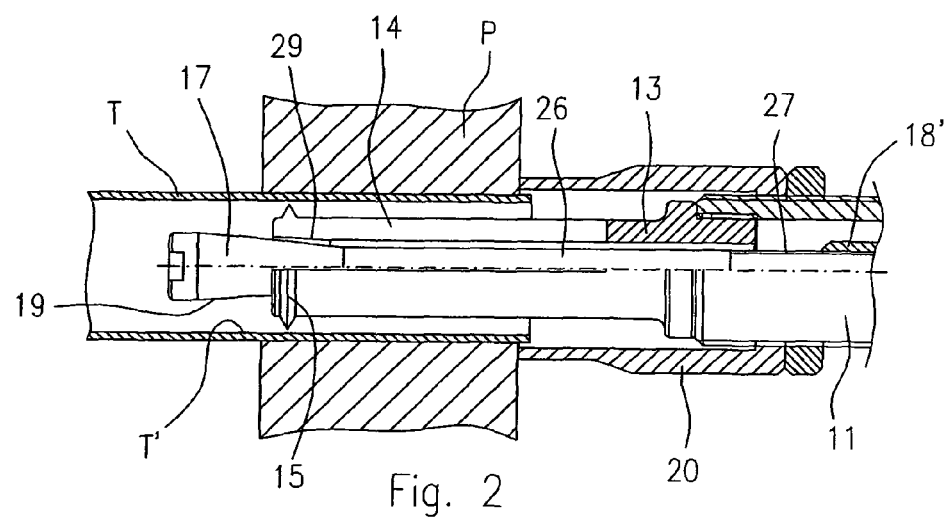
FIG. 2 is an enlarged detail of the device of FIG. 1, in a forward disengagement position of the divarication head.
Figure 3:
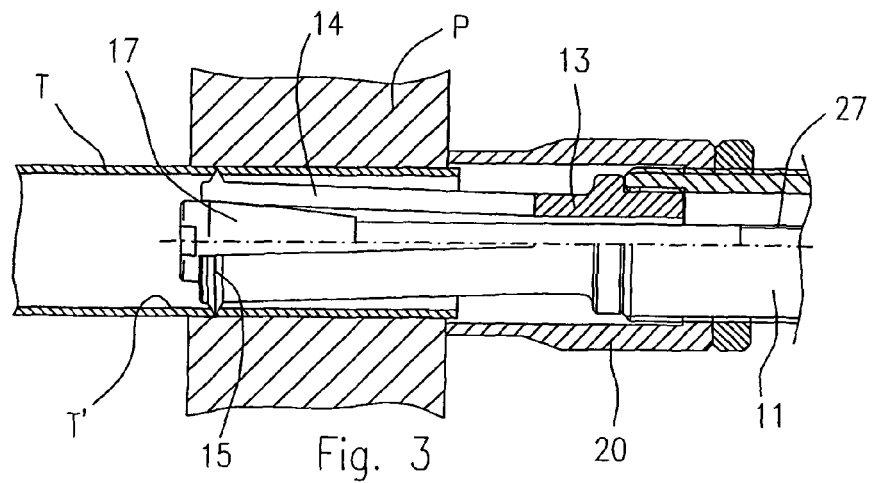
FIG. 3 is an enlarged detail of the device of FIG. 1, in a back position of the divarication head in which the work tool executes the cutting of a metal tube against a stop element arranged peripherally to the tube itself.

In FIGS. 1-3, a first embodiment is illustrated of a multi-purpose expansion work device, in particular for the cutting of metal tubes, according to the present invention; the illustrated device is in the form of a manual-use "pistol", employable for example for cutting metal tubes in heat exchangers and the like, in order to permit their dismantling.

The work device, indicated overall with the reference number 10, comprises a tubular support body 11 having a longitudinal axis, to which a work tool 12 is connected, axially insertable in a metal tube T.

The work tube 12, for example in hardened steel or other material suitable for ensuring high strength and elasticity characteristics, has a tubular base 13, fixed to the support body 11, and a plurality of elastically spreadable longitudinal arms 14, which stretch out from the base 13 of the work tool 12; each of the arms 14 is externally provided with a respective operative edge 15 intended to come into contact with an inner surface T' of the metal tube T.

In the illustrated case, the operative edge 15 of each of the elastic arms 14 is in the form of an acuminated cutting edge 15, intended to radially penetrate in the metal tube T through the aforesaid inner surface T' of the tube T itself. The work device 10 also comprises an expansion member 16 for divaricating the elastic arms 14, which is provided at a first end with a conical divarication head 17, and is operatively connected at a second end to a linear actuator 18 provided with a linearly movable force transmission rod 18', for example a hydraulic cylinder or linear actuator of electric type.

The divarication head 17 has a lateral thrust surface 19 converging towards the linear actuator 18 (even a lateral thrust surface diverging towards the linear actuator 18 is conceivable in a different embodiment of the present invention), with a taper preferentially in the range of 6°-14°, and the linear actuator 18 is connected to the head 17 itself to set a movement in the work tool 12 between a forward disengagement position and a back divarication position (or viceversa in a different embodiment of the present invention) of the elastic arms 14 of the tool 12, against the inner surface T' of the metal tube T, as illustrated in FIGS. 2 and 3.

The device 10 moreover comprises manually operable stop means for adjusting the insertion depth of the tool 12 inside the metal tube T.

Such stop means for example comprise a tubular stop means 20, fixed axially in an adjustable manner to the support body 11, as well as coaxially arranged outside the work tool 12.

The stop element 20 has a front end 20' intended to come into contact with a shoulder surface foreseen peripherally to a metal tube T to be worked, for example a lateral surface of a tube plate P of support of a bundle of tubes T of a heat exchanger.

The tubular stop element 20 is preferentially provided with adjustment screw means 20" of the axial position, engageable with a thread 21 foreseen on the support body 11; moreover, the tubular element 20 can be maintained in a desired position by means of an appropriate locking ring B foreseen on the support body 11.

In order to permit the cutting of the metal tubes, a stop element is foreseen peripherally to each tube T to oppose the radial deformation of the tube T itself, so to permit the cutting edge 15 of the tool 12 to penetrate through the inner surface T' of the tube T.

Figure 4:
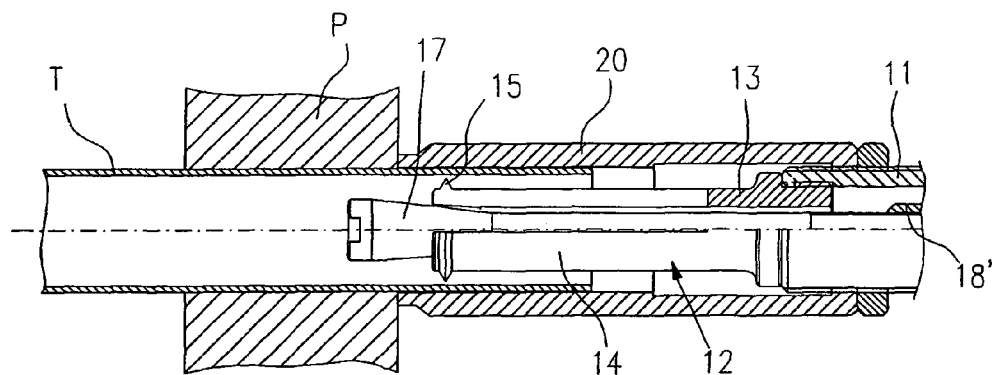
FIG. 4 is an enlarged detail of a second embodiment of the expansion cutting device, in which the stop element for the cutting of the metal tubes is composed of the tubular stop element of the device.

In the case illustrated in FIGS. 2 and 3, the stop element is for example composed of a tube plate P of the heat exchanger. On the other hand, in the embodiment illustrated in FIG. 4, in which the tubular stop element 20 is axially extended up until the operative edge of the tool 12, the stop element is composed of the same stop element 20.

Figure 7:
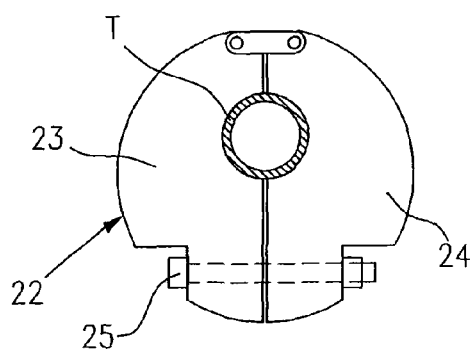
FIG. 7 is a front view of a separated tool, peripherally applicable to a tube for the cutting or expansion of the tube itself by means of the work device according to the present invention.
Figure 8:
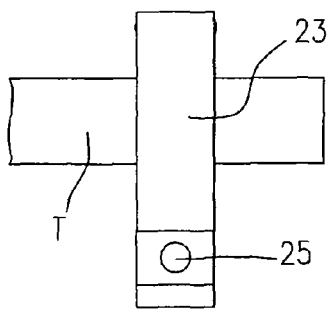
FIG. 8 is a side view of the separated tool of FIG. 7.
Figure 9:
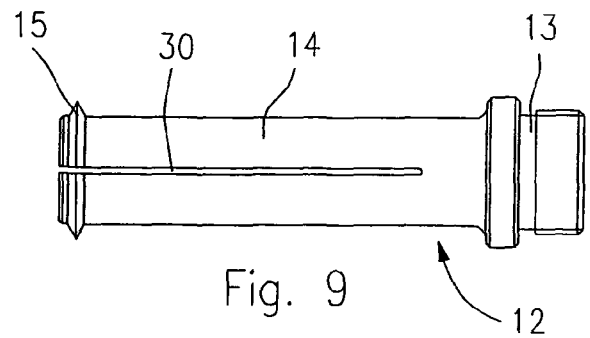
FIG. 9 is a side view of the work tool provided with an acuminated cutting tool.

Alternatively, as illustrated in FIGS. 7 and 8, the stop element can be composed of a separated tool 22, for example comprising a first and a second jaw 23, 24 hinged at one of their ends, and is shaped so to be peripherally closable around the metal tube T to be worked and connectable to each other by means of appropriate locking means 25.

Preferentially, the conical divarication head 17 of the device 10 according to the present invention is connected to the linear actuator 18 in an axially adjustable manner.

For example, in the case illustrated in FIG. 1, the conical dilatation head 17 has a longitudinal stem 26 of connection with the linear actuator 18, which ends with an adjustment thread 27 of the axial position of the head, engageable with a corresponding thread 28 of the movable rod 18' of the linear actuator 18.

In this manner, longitudinal stroke of the movable rod 18' of the actuator 18 being equal, it is possible to adjust the expansion of the arms 14 of the tool 12, foreseeing that the conical head 17 penetrates in the work tool 12 itself in a predetermined manner each time as a function of the diameter and thickness characteristics of the tube T to be cut, also as a function of how much the cutting edge 15 must penetrate in the tube T itself in order to execute the complete cut or simple incision which defines a breaking point for the tube. A similar structure permits a considerable simplification on the level of control of the linear actuator 18, since only a single stroke is previously set for the movable rod 18', and therefore there is no need to control and stop the movable rod 18' itself in different positions.

Preferentially, each of the elastic arms 14 of the work tool 12, on an opposite side with respect to the operative edge 15, has a tilted contact surface 29 for the thrust surface 19 of the divarication head 17.

Figure 5:
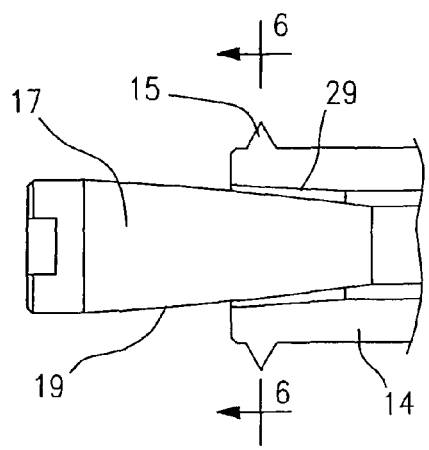
FIG. 5 is an enlarged detail of the divarication head and of the acuminated cutting edge of the work tool.

As is better illustrated in the detail of FIG. 5, the lateral surface 19 of the divarification head 17 preferably has a convex profile, which is shaped and arranged for defining a contact zone with the tilted surface 29 of the work tool 12, so that the contact zone itself is extended and constantly maintained at the operative edge 15 of the work tool 12, during the movement of the divarication head 17 through the work tool 12 itself.

The contact surface 29 of the elastic arms 14 preferentially has a tilt in the range of 1°-5°, with an orientation converging towards the base 13 of the work tool 12.

In order to increase the lifetime and reliability of the device 10, preferentially the lateral surface 19 of the conical head 17, the operative edge 15 of the work tool 12 and/or the tilted contact surface 29 of the work tool 12 has a hardened wear-resistant surface layer, obtained for example by means of an appropriate coating or a heat treatment of the aforesaid parts.

Figure 6:
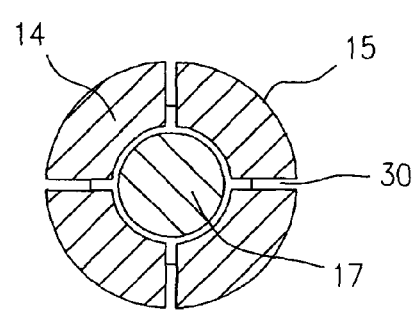
FIG. 6 is a cross section of FIG. 5, along line 6-6.

The work tool 12 of the device 10 can have a variable number of elastic arms 14 as a function of the diameter of the tool 12 itself, foreseeing in particular for example three elastic arms 14 in the case of a tool 12 with 6 mm diameter, up to a number of five-six arms 14 in the case of tools with greater diameter; for example, as illustrated in FIG. 6, the work tool 12 can comprise four arms 14, separated from each other by slits 30 which end at the base 13 of the tool 12 with appropriate rounded form so to not give rise to break points for the tool 12 itself.

From the foregoing, it is evident how the work device 10 according to the present invention is structurally simple and reliable, since the specific shape of the expansion member 16, which foresees the conical divarication head 17 converging towards the linear actuator 18, and the connection stem 26 having reduced diameter corresponding to the vertex of the conical head 17 itself, permits the use of a work tool 12 having elastic arms 14 with high radial thickness, which thus have considerably increased strength and elasticity characteristics.

This translates into high device reliability, with particular reference to the risk of breaking the arms of the work tool, and permits a structural simplification, since due to the greater elasticity of the arms themselves it is no longer necessary to foresee suitable means for assisting with its reclosure once the tube cutting has been executed.

Moreover, the work device according to the present invention permits executing the cutting of the metal tubes in considerably limited times with respect to known devices, with particular reference to those of manual use with rotating tool.

Figure 10:
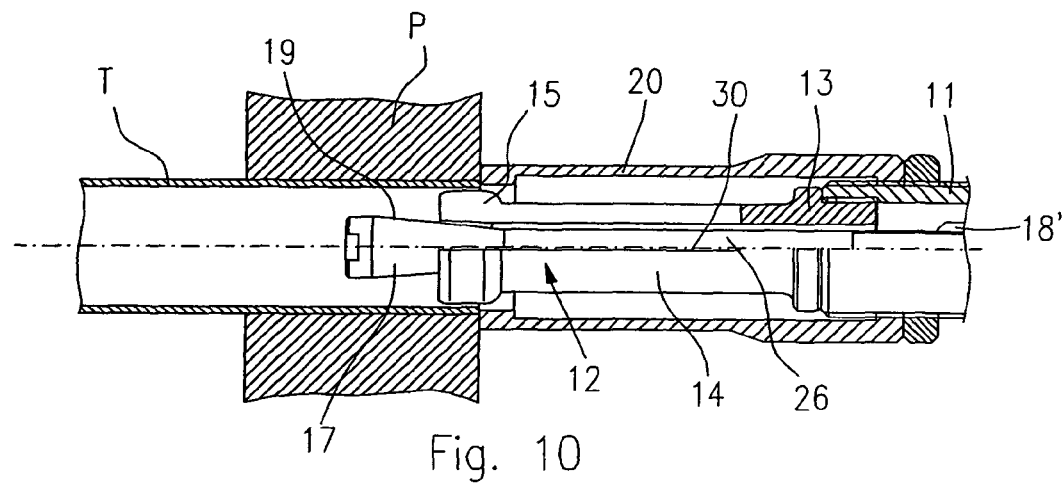
FIG. 10 is an enlarged detail of a further embodiment of the work device according to the present invention, in particular in the form of a device for the expansion of tubes, in a forward disengagement position of the divarication head.
Figure 11:
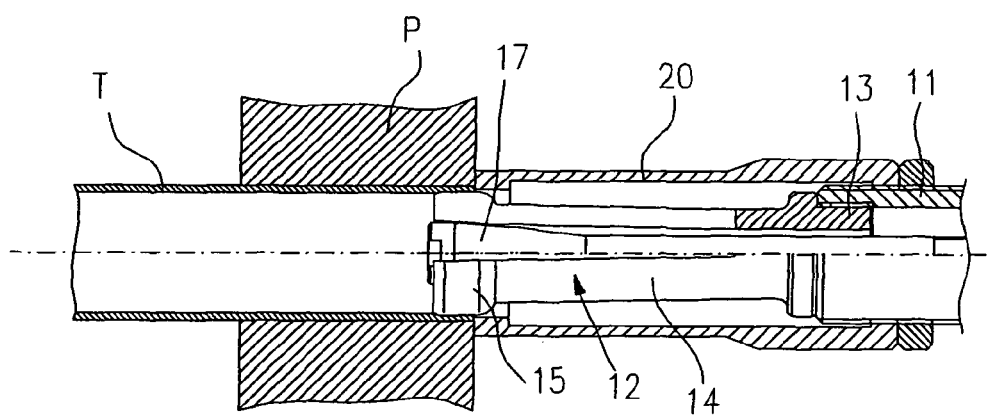
FIG. 11 represents the device of FIG. 10, in a back position of the divarication head in which the work tool executes the expansion of a metal tool against a stop element arranged peripherally to the tube itself.

A further embodiment of the work device according to the present invention is illustrated in FIGS. 10 and 11, in which the same numeric references were used to indicate similar or equivalent parts.

The illustrated work device 10 is in particular suitable for the expansion of a metal tube, and can for example be employed for expanding a metal tube T against a tube plate P of a heat exchanger so to permit welding the tube T to the plate P itself, eliminating the risk of executing a defective welding due to the presence of clearance between the tube T and plate P.

In a device 10 of this type, the operative edge 15 of each of the elastic arms 14 of the tool 12 is in the form of a smoothed expansion edge 15, intended to radially enlarge the metal tube to be worked.

Since the elastic arms 14 of the tool 12 are also in this case separated by slits 30, a single expansion operation carried out with the device 10 would lead to irregularities of the expansion itself at the aforesaid slits 30.

Such irregularities can in any case be eliminated by carrying out a second expansion operation, with the device 10 rotated several degrees inside the tube T.

In the case of the device 10 according to the present invention, the expansion of the tube can occur against a stop element, as for the preceding embodiments, or it is also possible to carry out a free expansion of the tube, defined only by the expansion of the tool 12.

Regarding the other characteristics and advantages of the device 10, one should view the descriptions of the other embodiments.

That stated and shown with reference to the attached drawings was given merely as an exemplifying and illustrating example of the general characteristics of the invention, as well as of its preferential embodiments; therefore, other modifications and variants of the multipurpose expansion work device for cutting or expansion of metal tubes are possible, without departing from the object of the claims.

The invention claimed is:

1. Multipurpose expansion work device for the cutting, incision or expansion of metal tubes, of the type comprising:
   a tubular support body having a longitudinal axis;
   a work tool axially insertable in a metal tube, the work tool having a tubular base fixed to the support body, and a plurality of elastically spreadable longitudinal arms which stretch out from said base of the work tool, each of said arms being externally provided with a respective operative edge intended to come into contact with an inner surface of the metal tube; and
   an expansion member for divaricating said elastic arms of the tool, said expansion member being provided at a first end with a conical divarication head having a lateral thrust surface and being operatively connected at a second end to a linear actuator to move the head in said work tool between a disengagement position and a divarication position of the elastic arms of the work tool against the inner surface of the metal tube, and in that it comprises manually operable stop means for adjusting the insertion depth of the tool inside the metal tube.

2. Multipurpose expansion work device according to claim 1, wherein said manually operable stop means comprise a tubular stop element fixed axially in an adjustable manner to the support body, said stop element being coaxially arranged outside said work device.

3. Multipurpose expansion work device according to claim 2, wherein said tubular stop element has a front end configured to abut a shoulder surface arranged peripherally to a metal tube to be worked.

4. Multipurpose expansion work device according to claim 2, wherein said tubular stop element is provided with adjustment screw means of the axial position on said support body.

5. Multipurpose expansion work device according to claim 2, in particular for the cutting or expansion of metal tubes against a stop element arranged peripherally to each tube, wherein said stop element for the cutting or expansion of the metal tubes is composed of said tubular stop element, which extends to an axial position overlying said operative edge of the work tool with the tube insertable between the tubular stop element and the operative edge of the work tool.

6. Multipurpose expansion work device according to claim 1, in particular for the working of metal tubes in a heat exchanger provided with tube plates of support of the tubes themselves, wherein said tube plates of the heat exchanger constitute a stop element for the cutting or expansion of the metal tubes.

7. Multipurpose expansion work device according to claim 1, in particular for the cutting or expansion of metal tubes against a stop element arranged peripherally to each tube, wherein said stop element for the cutting or expansion of a metal tube is in the form of a separated tool comprising a first and a second jaw hinged at one of their ends, said jaws being shaped so to be peripherally reclosable around the metal tube to be worked.

8. Multipurpose expansion work device according to claim 1 wherein the conical divarication head of said expansion member is connected to said linear actuator in an axially adjustable manner.

9. Multipurpose expansion work device according to claim 8, wherein the linear actuator has a linearly movable transmission rod of the force and the conical divarication head has a longitudinal connection stem with said linear actuator, the connection stem terminating with an adjustment thread of the axial position of said head, engageable with a corresponding thread of the movable rod of the linear actuator.

10. Multipurpose expansion work device according to claim 1, wherein the lateral thrust surface of the conical divarication head has a taper in the range of 6°-14°.

11. Multipurpose expansion work device according to claim 1, wherein each of said elastic arms of the work tool, on an opposite side with respect to the operative edge, has a tilted contact surface for the lateral thrust surface of the conical divarication head.

12. Multipurpose expansion work device according to claim 11, wherein the lateral thrust surface of the conical divarication head has a convex profile, shaped and arranged to define a contact zone with said tilted contact surface of the work tool, which is constantly extended at the operative edge of said work tool, during the movement of the divarication head through the work tool itself.

13. Multipurpose expansion work device according to claim 11, wherein the tilted contact surface of said work tool has a tilt in the range of 1°-5°, with an orientation converging towards the base of the work tool.

14. Multipurpose expansion work device according to claim 11, wherein the lateral thrust surface of the conical divarication head, the operative edge of the work tool and/or the tilted contact surface of said work tool have a hardened wear-resistant surface layer.

15. Multipurpose expansion work device according to claim 1, wherein the linear actuator is a hydraulic cylinder.

16. Multipurpose expansion work device according to claim 1, wherein the linear actuator is of electric type.

17. Multipurpose expansion work device according to claim 1, wherein the work tool is made of hardened steel.

18. Multipurpose expansion work device according to claim 1, in particular for the cutting of a metal tube, wherein the operative edge of each of said elastic arms of the work tool is in the form of an acuminated cutting edge intended to radially penetrate in the metal tube through the inner surface of the tube itself.

19. Multipurpose expansion work device according to claim 1, in particular for the expansion of a metal tube, wherein the operative edge of each of said elastic arms of the work tool is in the form of a smoothed expansion edge intended to radially enlarge the metal tube to be worked.

* * * * *